(12) United States Patent
Chang et al.

(10) Patent No.: US 10,711,331 B2
(45) Date of Patent: Jul. 14, 2020

(54) POLYCRYSTALLINE DIAMOND COMPACT WITH GRADIENT INTERFACIAL LAYER

(71) Applicant: Halliburton Energy Services, Inc., Houston, TX (US)

(72) Inventors: Andy Cheng Chang, Houston, TX (US); Gagan Saini, Conroe, TX (US); Qi Liang, The Woodlands, TX (US); Paul B. Lively, Houston, TX (US); William Brian Atkins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/562,020

(22) PCT Filed: Apr. 28, 2015

(86) PCT No.: PCT/US2015/028018
§ 371 (c)(1),
(2) Date: Sep. 27, 2017

(87) PCT Pub. No.: WO2016/175763
PCT Pub. Date: Nov. 3, 2016

(65) Prior Publication Data
US 2018/0087134 A1    Mar. 29, 2018

(51) Int. Cl.
*E21B 10/573*    (2006.01)
*C22C 26/00*    (2006.01)
(Continued)

(52) U.S. Cl.
CPC .............. *C22C 26/00* (2013.01); *B22F 3/008* (2013.01); *B22F 3/1055* (2013.01); *B22F 3/14* (2013.01);
(Continued)

(58) Field of Classification Search
CPC ..................................................... E21B 10/567
(Continued)

(56) References Cited

U.S. PATENT DOCUMENTS 4,604,106 A * 8/1986 Hall .................. B01J 3/062
                                               175/434
4,871,377 A   10/1989 Frushour
(Continued)

FOREIGN PATENT DOCUMENTS

CN    101646527    2/2010
EP    1943408    7/2008
(Continued)

OTHER PUBLICATIONS

Voronov, O., et al. Superhard nanophase cutter materials for rock drilling applications. No. DOE/ER/82154-1. Diamond Materials Inc., Piscataway, NJ (US), 2000; 96 pages.
(Continued)

*Primary Examiner* — Taras P Bemko
(74) *Attorney, Agent, or Firm* — Baker Botts L.L.P.

(57) ABSTRACT

The present disclosure relates to a polycrystalline diamond compact (PDC) including a gradient interfacial layer between a thermally stable diamond (TSP) table and a base, such as a substrate or an earth-boring drill bit body. The gradient interfacial layer has a gradient of coefficients of thermal expansion between that of the diamond and the base. The disclosure also relates to methods of forming a gradient interfacial layer and a PDC containing such a layer.

22 Claims, 6 Drawing Sheets

(51) Int. Cl.
*B22F 3/00* (2006.01)
*B22F 3/105* (2006.01)
*B22F 3/14* (2006.01)
*B22F 7/06* (2006.01)
*B22F 5/00* (2006.01)

(52) U.S. Cl.
CPC ............ *B22F 7/06* (2013.01); *E21B 10/5735* (2013.01); *B22F 2005/001* (2013.01); *B22F 2207/11* (2013.01); *B22F 2998/10* (2013.01); *C22C 2204/00* (2013.01); *Y02P 10/295* (2015.11)

(58) Field of Classification Search
USPC ........................................................ 175/434
See application file for complete search history.

(56) References Cited

U.S. PATENT DOCUMENTS

| | | | |
|---|---|---|---|
| 5,127,923 A | 7/1992 | Bunting et al. | |
| 6,063,333 A * | 5/2000 | Dennis | B22F 3/105 419/6 |
| 6,797,326 B2 | 9/2004 | Griffin et al. | |
| 7,435,478 B2 | 10/2008 | Keshavan | |
| 7,475,744 B2 | 1/2009 | Pope | |
| 7,493,965 B1 | 2/2009 | Bertagnolli et al. | |
| 7,493,972 B1 | 2/2009 | Schmidt et al. | |
| 7,516,804 B2 | 4/2009 | Vail | |
| 7,533,739 B2 | 5/2009 | Cooley et al. | |
| 7,543,662 B2 | 6/2009 | Belnap et al. | |
| 7,604,073 B2 | 10/2009 | Cooley et al. | |
| 7,635,035 B1 | 12/2009 | Bertagnolli et al. | |
| 7,681,669 B2 | 3/2010 | Cannon et al. | |
| 7,757,790 B1 | 7/2010 | Schmidt et al. | |
| 7,762,359 B1 | 7/2010 | Miess | |
| 7,841,428 B2 | 11/2010 | Bertagnolli | |
| 7,842,111 B1 | 11/2010 | Sani | |
| 7,845,436 B2 | 12/2010 | Cooley et al. | |
| 7,845,438 B1 | 12/2010 | Vail et al. | |
| 7,866,418 B2 | 1/2011 | Bertagnolli et al. | |
| 7,874,383 B1 | 1/2011 | Cannon et al. | |
| 7,918,293 B1 | 4/2011 | Vail | |
| 7,942,218 B2 | 5/2011 | Cooley et al. | |
| 7,950,477 B1 | 5/2011 | Bertagnolli et al. | |
| 7,951,213 B1 | 5/2011 | Miess et al. | |
| 7,971,663 B1 | 7/2011 | Vail | |
| 7,972,397 B2 | 7/2011 | Vail | |
| 7,987,931 B2 | 8/2011 | Cooley et al. | |
| 7,998,573 B2 | 8/2011 | Qian et al. | |
| 8,020,644 B2 | 9/2011 | Keshavan | |
| 8,020,645 B2 | 9/2011 | Bertagnolli et al. | |
| 8,057,775 B2 | 11/2011 | Vail et al. | |
| 8,061,452 B2 | 11/2011 | Cooley et al. | |
| 8,061,458 B1 | 11/2011 | Bertagnolli et al. | |
| 8,069,937 B2 | 12/2011 | Mukhopadhyay et al. | |
| 8,071,173 B1 | 12/2011 | Sani | |
| 8,074,566 B1 | 12/2011 | Bach | |
| 8,074,748 B1 | 12/2011 | Miess et al. | |
| 8,079,431 B1 | 12/2011 | Cooley et al. | |
| 8,080,071 B1 | 12/2011 | Vail | |
| 8,080,074 B2 | 12/2011 | Sani | |
| 8,083,012 B2 | 12/2011 | Voronin et al. | |
| 8,141,656 B1 | 3/2012 | Bertagnolli et al. | |
| 8,146,687 B1 | 4/2012 | Vail | |
| 8,147,790 B1 | 4/2012 | Vail et al. | |
| 8,151,911 B1 | 4/2012 | Miess | |
| 8,158,258 B2 | 4/2012 | Bertagnolli et al. | |
| 8,210,285 B2 | 7/2012 | Cooley et al. | |
| 8,216,677 B2 | 7/2012 | Mukhopadhyay et al. | |
| 8,230,953 B1 | 7/2012 | Vail et al. | |
| 8,246,701 B2 | 8/2012 | Vail | |
| 8,276,691 B2 | 10/2012 | Qian et al. | |
| 8,286,735 B1 | 10/2012 | Cooley et al. | |
| 8,297,382 B2 | 10/2012 | Bertagnolli et al. | |
| 8,312,943 B1 | 11/2012 | Miess et al. | |
| 8,342,269 B1 | 1/2013 | Bertagnolli et al. | |
| 8,353,371 B2 | 1/2013 | Cooley et al. | |
| 8,360,169 B1 | 1/2013 | Bertagnolli et al. | |
| 8,361,429 B2 | 1/2013 | Vail et al. | |
| 8,371,212 B1 | 2/2013 | Bach | |
| 8,393,419 B1 | 3/2013 | Burton | |
| 8,439,137 B1 | 5/2013 | Galloway | |
| 8,440,303 B2 | 5/2013 | Mukhopadhyay et al. | |
| 8,448,727 B1 | 5/2013 | Miess | |
| 8,479,845 B1 | 7/2013 | Qian et al. | |
| 8,499,859 B1 | 8/2013 | Cooley et al. | |
| 8,501,144 B1 | 8/2013 | Bertagnolli | |
| 8,505,655 B1 | 8/2013 | Pope | |
| 8,512,865 B2 | 8/2013 | DiGiovanni | |
| 8,528,670 B1 | 9/2013 | Cooley et al. | |
| 8,529,649 B2 | 9/2013 | Sani et al. | |
| 8,561,728 B2 | 10/2013 | Cooley et al. | |
| 8,596,387 B1 | 12/2013 | Sani et al. | |
| 8,602,130 B1 | 12/2013 | Burton | |
| 8,602,132 B2 | 12/2013 | Bertagnolli et al. | |
| 8,608,815 B2 | 12/2013 | Mukhopadhyay et al. | |
| 8,616,306 B2 | 12/2013 | Bertagnolli et al. | |
| 8,617,310 B1 | 12/2013 | Vail | |
| 8,622,157 B1 | 1/2014 | Bertagnolli et al. | |
| 8,627,904 B2 | 1/2014 | Voronin | |
| 8,662,207 B2 | 3/2014 | Brackin et al. | |
| 8,662,210 B2 | 3/2014 | Mukhopadhyay et al. | |
| 8,679,206 B2 | 3/2014 | Wan | |
| 8,689,912 B2 | 4/2014 | Belnap et al. | |
| 8,689,913 B2 | 4/2014 | Cooley et al. | |
| 8,701,798 B1 | 4/2014 | Qian et al. | |
| 8,702,824 B1 | 4/2014 | Sani et al. | |
| 8,727,046 B2 | 5/2014 | Miess et al. | |
| 8,911,521 B1 * | 12/2014 | Miess | C04B 35/52 51/293 |
| 2003/0072669 A1 | 4/2003 | Butcher et al. | |
| 2004/0199260 A1 | 10/2004 | Pope et al. | |
| 2005/0241239 A1 | 11/2005 | Sung | |
| 2006/0180354 A1 * | 8/2006 | Belnap | E21B 10/573 175/374 |
| 2007/0079992 A1 * | 4/2007 | Curry | C22C 29/08 175/374 |
| 2009/0032169 A1 | 2/2009 | Dourfaye et al. | |
| 2010/0212971 A1 | 8/2010 | Mukhopadhyay et al. | |
| 2010/0242375 A1 | 9/2010 | Hall et al. | |
| 2010/0264134 A1 | 10/2010 | Peterson et al. | |
| 2011/0067929 A1 | 3/2011 | Mukhopadhyay et al. | |
| 2011/0120782 A1 | 5/2011 | Cooley et al. | |
| 2011/0171414 A1 * | 7/2011 | Sreshta | B22F 7/06 428/64.1 |
| 2012/0005966 A1 | 1/2012 | Cleboski et al. | |
| 2012/0103701 A1 * | 5/2012 | Cho | B23B 51/02 175/428 |
| 2012/0261197 A1 | 10/2012 | Miess et al. | |
| 2013/0205677 A1 | 8/2013 | Bertagnolli et al. | |
| 2013/0228383 A1 | 9/2013 | Mukhopadhyay et al. | |
| 2013/0264125 A1 | 10/2013 | Miess et al. | |
| 2013/0269263 A1 | 10/2013 | Vail | |
| 2014/0069022 A1 | 3/2014 | Mukhopadhyay et al. | |
| 2014/0102810 A1 | 4/2014 | Peterson et al. | |
| 2014/0115971 A1 | 5/2014 | Sani et al. | |
| 2014/0123562 A1 | 5/2014 | Voronin | |
| 2014/0231151 A1 | 8/2014 | Matthias et al. | |
| 2014/0237906 A1 | 8/2014 | Alkhalaileh et al. | |
| 2015/0060151 A1 * | 3/2015 | Fang | E21B 10/46 175/430 |

FOREIGN PATENT DOCUMENTS

| | | |
|---|---|---|
| EP | 2143872 | 1/2010 |
| EP | 2198108 | 6/2010 |
| EP | 2649213 | 10/2013 |
| EP | 2663440 | 11/2013 |
| EP | 2688700 | 1/2014 |
| WO | 2012/078314 | 6/2012 |
| WO | 2012/096819 | 7/2012 |
| WO | 2012/128948 | 9/2012 |

(56) References Cited

FOREIGN PATENT DOCUMENTS

OTHER PUBLICATIONS

Jaworska, L. "Diamond-ceramic bonding phase composites for application in cutting tools." Materialy Ceramiczne 63.1 (2011): 131-137; 7 pages.
Ther, Olivier, et al. "Reactive imbibition of WC-Co substrate for PDC cutters used in oil and gas and mining drilling." 2012 Powder Metallurgy World Congress & Exhibition. 2012; 9 pages.
Besson, Alain, et al. "On the cutting edge." Oilfield Review 12.3 (2000): 36-57; 22 pages.
International Search Report and Written Opinion for PCT Patent Application No. PCT/US2015/028018, dated Jan. 18, 2016; 16 pages.
Office Action for Chinese Application No. 201580078046.8, dated Nov. 21, 2018; 13 pages.

\* cited by examiner

POLYCRYSTALLINE DIAMOND COMPACT WITH GRADIENT INTERFACIAL LAYER

RELATED APPLICATIONS

This application is a U.S. National Stage Application of International Application No. PCT/US2015/028018 filed Apr. 28, 2015, which designates the United States, and is incorporated herein by reference in its entirety.

TECHNICAL FIELD

The current disclosure relates to a polycrystalline diamond compact (PDC) containing thermally stable diamond (TSP), such as a cutter in an earth-boring drill bit.

BACKGROUND

Components of various industrial devices are often subjected to extreme conditions, such as high-temperatures and high-impact contact with hard and/or abrasive surfaces. For example, extreme temperatures and pressures are commonly encountered during drilling for oil extraction or mining purposes. Diamond, with its unsurpassed mechanical properties, can be the most effective material when properly used in a cutting element or abrasion-resistant contact element for use in drilling. Diamond is exceptionally hard, conducts heat away from the point of contact with the abrasive surface, and may provide other benefits in such conditions.

Diamond in a polycrystalline form has added toughness as compared to single-crystal diamond due to the random distribution of the diamond crystals, which avoids the particular planes of cleavage found in single-crystal diamond. Therefore, polycrystalline diamond is frequently the preferred form of diamond in many drilling applications. A drill bit cutting element that utilizes polycrystalline diamond is commonly referred to as a polycrystalline diamond cutter or compact (PDC). Accordingly, a drill bit incorporating PDC may be referred to as a PDC bit.

PDCs can be manufactured in a press by subjecting small grains of diamond and other starting materials to ultrahigh pressure and temperature conditions. One PDC manufacturing process involves forming a polycrystalline diamond table directly onto a substrate, such as a tungsten carbide substrate. The process involves placing a substrate, along with loose diamond grains mixed with a catalyst, into a container of a press, and subjecting the contents of the press to a high-temperature high-pressure (HTHP) press cycle. The high temperature and pressure cause the small diamond grains to form into an integral polycrystalline diamond table intimately bonded to the substrate, with cobalt in tungsten carbide substrate acting as a catalyst. A polycrystalline diamond table thus formed may then be leached to remove the catalyst from all or part of the polycrystalline diamond. Leaching out large portions of the catalyst results in a TSP table. At a certain temperature, typically at least 750° C. at normal atmospheric pressure, the TSP will not crack or graphitize. The TSP may then be reattached to a new substrate (the original one on which the polycrystalline diamond was formed often being removed prior to or destroyed in the leaching process) to PDC.

BRIEF DESCRIPTION OF THE DRAWINGS

A more complete understanding of the present embodiments and advantages thereof may be acquired by referring to the following description taken in conjunction with the accompanying drawings, which show particular embodiments of the current disclosure, in which like numbers refer to similar components, and in which.

DETAILED DESCRIPTION

The present disclosure relates to a gradient interfacial layer for attachment of a TSP table to a substrate to form a PDC. It also relates to a PDC, such as PDC cutter containing a gradient interfacial layer as well as an industrial device, such as an earth-boring drill bit, containing such as a PDC.

In order to make polycrystalline diamond more thermally stable, a designer of a drill bit may leach out some of the catalyst (typically a material containing a Group VIII metal or metal alloy, such as cobalt (Co) or a Co alloy) used in the formation of the polycrystalline diamond. If the entire polycrystalline diamond table or substantially all of it has been leached, the table may then be a TSP table. The TSP table may also lack a substrate, which may have been present during formation of the polycrystalline diamond used to create the TSP. The substrate may have been mechanically removed, destroyed by the leaching process, or both. A TSP table may include some residual catalyst, such as no more than 70% of the catalyst originally found in the PCD table or no more than 1% catalyst by weight or volume. The TSP table may be thermally stable at temperatures of at least 750° C., at least 1050° C. or even at least 1200° C. at atmospheric pressure. The TSP table may otherwise also be thermally stable at temperatures and pressures at which graphitization of diamond in the presence of catalyst is expected to occur.

The TSP table may be attached to a new substrate to form a PDC. Because of the low CTE of diamond as compared to most brazing materials, substrates, and other attachment materials, even after attachment, the TSP element may fail due to stresses from different rates of thermal expansion in the TSP, substrate, and/or attachment material.

The current disclosure relates to an interfacial gradient layer between the TSP table and the substrate containing varying amounts of a material having a low CTE in order to control residual stresses from differing CTEs between the TSP table and the substrate.

Although the present disclosure focuses on attachment of a TSP table to a substrate, one of ordinary skill in the art will recognize that a TSP table may be similarly attached to other bases, such as a bit body, using similar methods. This represents an improvement over conventional methods using HIP-sintered tungsten carbide.

The substrate may include a cemented carbide, such as tungsten carbide (WC or $W_2C$) with suitable binder. The substrate may further include a metal or metal alloy binder, such as a Group VIII metal or metal alloy, particularly cobalt (Co) or a Co alloy, which may be the same as or different from the catalyst used in polycrystalline diamond formation.

Figure 1:
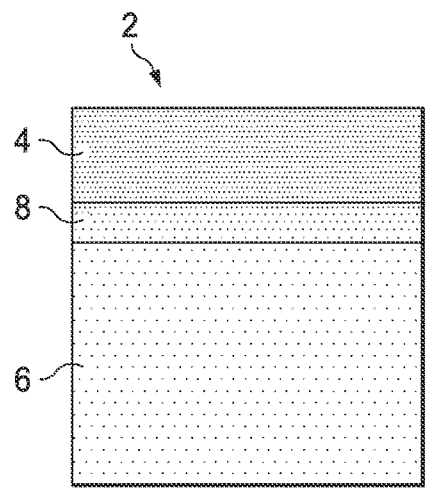
FIG. 1 is a not-to-scale cross-section view of a first embodiment of a PDC with a gradient interfacial layer.

FIG. 1 is a cross-sectional schematic drawing of a PDC 2 containing a TSP table 4, a substrate 6, and a gradient interfacial layer 8, with sublayers as indicated by gradations of shading. Sublayers of gradient interfacial layer 8 may have increasing CTEs further away from TSP table 4 and closer to substrate 6. Although TSP table 4, substrate 6, and gradient interfacial layer 8 are depicted in FIG. 1 with planar adjacent and external surfaces, the disclosure encompasses all possible non-planar adjacent and external interfaces or surfaces for these components. Gradient interfacial layer 8 may have a plurality of sublayers, which may include at least two sublayers, at least five sublayers, at least 10 sublayers, at least 20 sublayers, or at least 50 sublayers.

Figure 2:
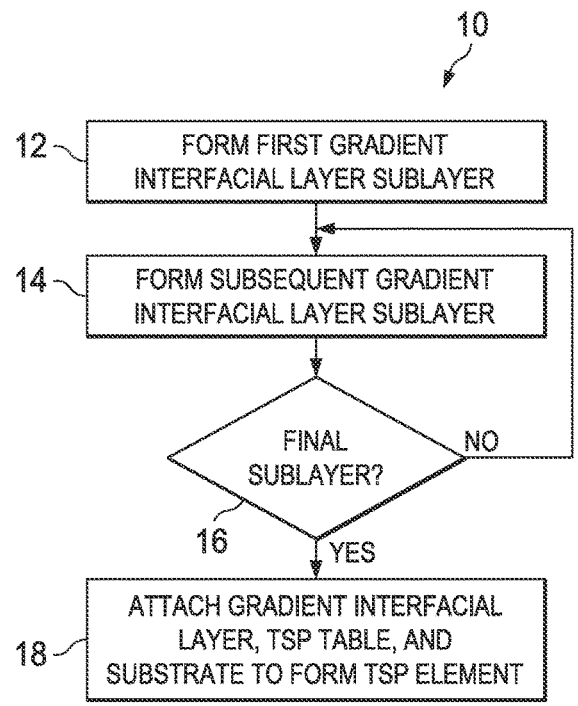
FIG. 2 is a flow-chart of a method of forming a PDC with a gradient interfacial layer.

FIG. 2 is a flow-chart of a fabrication method 10 for a TSP element with a gradient interfacial layer, such as PDC 2. In step 12, a first sublayer of the gradient interfacial layer is formed. In step 14, a second or other subsequent sublayer is formed. In step 16, whether the final sublayer has been reached is determined. If the final sublayer has not been reached, then step 14 is repeated. If the final sublayer has been reached, then in step 18 a PDC is formed by attaching the gradient interfacial layer, a TSP table, and/or a substrate to one another.

Prior to formation, the sublayers shown in PDC 2 or formed in fabrication method 10 may contain at least three components, a diamond powder or grit containing diamond grains, a catalyst able to cause bonding between the diamond grains, and a sacrificial binder able to adhere the diamond grains until the sacrificial binder is degraded and/or expelled, such as during formation of the sublayer or during attachment of the gradient interfacial layer to the TSP table and/or substrate. The concentration, weight proportion, or volume proportion of diamond grains per sublayer generally decreases within the gradient interfacial layer as one moves away from the portion that is or will be attached to the TSP table and towards the portion that is or will be attached to the substrate. The relative proportions may be determined based on the intended use as well as the degree of leaching of the TSP table and the composition of the substrate, among other factors, such that stresses due to CTE differences between the sublayers or between the TSP table and the substrate are below certain pre-selected thresholds. These thresholds may be selected to avoid debonding or cracking due to CTE mismatch, particularly over the time frames and temperature ranges experienced by a gradient interfacial layer during PDC contact with a formation during drilling and TSP element contact with a cooling material, such as a drilling fluid, also during drilling. Although typically the composition of different sublayers will vary between each layer, at times it may be beneficial to provide multiple layers, particularly adjacent multiple layers, with the same composition.

The diamond concentration in the gradient interfacial layer adjacent the TSP table may be 50% or greater by volume, 60% or greater by volume, 70% or greater by volume, or even 80% or greater by volume. The concentration of any catalyst or catalyst containing material, such as tungsten carbide (WC or $W_2C$) in the gradient interfacial layer adjacent the TSP table may be 50% or less by volume, 40% or less by volume, 30% or less by volume, or 20% or less by volume. The concentration of sacrificial binder in the gradient interfacial layer adjacent the TSP table may be 30% or less by volume, 20% or less by volume, 10% or less by volume, or 5% or less by volume.

Figure 3:
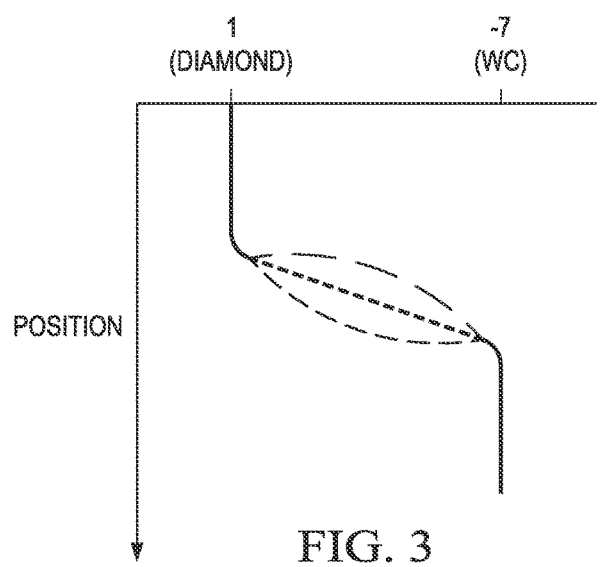
FIG. 3 is a graph showing change in the coefficient of thermal expansion (CTE) across a PDC with a TSP table, a gradient interfacial layer, and a tungsten carbide substrate; the green and red lines are schematic illustrations of non-linear CTE profiles.

The CTE profile of the gradient interfacial layer, such as gradient interfacial layer 8 or another layer formed by steps 12 to 16 may be linear, non-linear (such as step-wise by sublayer), sigmoidal, or any other shape. Example CTE profiles are illustrated in FIG. 3. The TSP table typically has a CTE of $1 \times 10^{-6}$ inches/inches $*/^\circ$ C. or, if not fully leached, still very close to this number. Cemented tungsten carbide has a CTE of $4\text{-}7 \times 10^{-6}$ inches/inches $*/^\circ$ C. Accordingly, for a PDC with a tungsten carbide substrate, the gradient interfacial layer has a CTE that gradually increases from near $1 \times 10^{-6}$ inches/inches $*/^\circ$ C. to near $4\text{-}7 \times 10^{-6}$ inches/inches $*/^\circ$ C. Similar increases can be provided for other substrates.

The thickness of gradient interfacial layer 8 or another gradient interfacial layer formed by steps 12 to 16 may be determined by the processes used to form sublayers, their content, the differences in CTE tolerable between sublayers, methods of attachment to the TSP table and substrate, and other factors. Typically the gradient interfacial layer will be between 1 micron and to 200 microns, although a layer may have a submicron thickness and may be up to 5 mm thick. Sublayers may each have approximately the same thickness, or they may vary in thickness. Sublayer thickness may be adjusted to produced differences in CTE profile, to accommodate different amounts of consolidation during sintering, and to accommodate various other property and process needs.

Diamond grain size may vary from sublayer to sublayer. In addition, within a sublayer the diamond grains may exhibit more than one size. Diamond grain size may be determined, for example, by passing the diamond grains through one or more sizing sieves or by any other method. Diamond grains in different sublayers or in the same sublayer may include a relatively larger size and at least one relatively smaller size. As used herein, the phrases "relatively larger" and "relatively smaller" refer to particle sizes determined by any suitable method, which differ by at least a factor of two. A relatively larger size may include 100 μm, 90 μm, 80 μm, 70 μm, 60 μm, 50 μm, 40 μm, 30 μm, 20 μm, 15 μm, 12 μm, 10 μm, or 8 μm. A relatively smaller size may include 30 μm, 20 μm, 10 μm, 15 μm, 12 μm, 10 μm, 8 μm, 4 μm, 2 μm, 1 μm, 0.5 μm, less than 0.5 μm, 0.1 μm, or less than 0.1 μm. The diamond grains exhibiting a relatively larger size may be between 40 μm and 15 μm and the diamond grains exhibiting a relatively smaller size may be between 12 μm and 2 μm. The diamond grains may also include three or more different sizes.

Diamond grain sizes may be varied by location in a layer to improve wear or mechanical properties and to control cracking during use. For instance, a sublayer may contain an inner ring with one grain size and an outer ring with a different grain size. A sublayer may also contain strips of diamond with different grain size than the remainder of the sublayer.

Non-diamond carbon, such as graphite particles, fullerenes, other non-diamond carbon, or combinations of the foregoing may be mixed with the diamond grains. The non-diamond carbon substantially converts to diamond during the HTHP processes used to form the gradient interfacial layer or PDC. The presence of the non-diamond carbon may enhance the diamond density of gradient interfacial layer. The non-diamond carbon may be selected to be present in a sublayer or in the gradient interfacial layer as a whole in an amount of 0.1 wt % to 20 wt %, such as 0.1 wt % to 10 wt %, 1 wt % to a 9 wt %, a 2 wt % to 9 wt %, a 3 wt % to 6 wt %, 4.5 wt % to 5.5 wt %, 5 wt %, 0.1 wt % to a 0.8 wt %, or a 0.1 wt % to 0.50 wt %. Any graphite particles in the non-diamond carbon may have an average particle size of 1 µm to 5 µm, such as 1 µm to 3 µm, so that the graphite particles may fit into interstitial regions defined by the diamond grains. The graphite particles may be crystalline graphite particles, amorphous graphite particles, synthetic graphite particles, or combinations thereof. The term "amorphous graphite" refers to naturally occurring microcrystalline graphite. Crystalline graphite particles may be naturally occurring or synthetic. Various types of graphite particles are commercially available from Ashbury Graphite Mills of Kittanning, Pa.

In addition, the catalyst may also vary in composition from sublayer to sublayer. In general, it may include a Group VIII metal or alloy, such as Co, nickel (Ni), iron (Fe), or alloys thereof, and any combinations thereof. Catalyst may be present in particles similar in size to the diamond grains. Catalyst particles may be, on average, 1 µm in diameter or longest dimension. Although conventional catalysts are primarily discussed herein new and non-conventional catalysts may also be used.

Sacrificial binder may include polyolefins, such as ethylene vinyl acetate, high density polyethylene, low density polyethylene, and polypropylene; functionalized polyolefins, such as ethylene ethyl acrylate, grafted maleic anhydride, and ionomers; waxes such as carnauba, bees wax, and bees wax blends; thermoplastic polyurethane; poly-aryl-ether-ether-ketones; functionalized styrenic block copolymers, such as anhydride grafted styrenic block copolymers; and tackifiers, such as pentaerythritol ester of rosin, glycero-ester of rosin modified with maleic anhydride, partially hydrogenated gum rosin, balsamic resin, esterified thermoplastic resin, partially polymerized (dimerized) rosin, aliphatic hydrocarbon resin, aliphatic hydrocarbon resin, aromatic modified aliphatic hydrocarbon resin, cycloaliphatic hydrocarbon resins, aromatic modified cycloaliphatic hydrocarbon resin, polyethylene-butyl acetate (PEBA), ethylene vinyl acetate (EVA), ethylene ethyl acetate, polyethylene glycol (PEG), poly vinyl alcohol (PVA), polystyrene (PS), polymethyl methacrylate, poly ethylene carbonate (PEC), polyalkylene carbonate (PAC), polycarbonate, poly propylene carbonate (PPC), nylons, polyvinyl chlorides, polybutenes, polyesters.

The binder may also include aqueous and gelation polymers or inorganic polymers. Suitable aqueous and gelation polymers may include those formed from cellulose, alginates, polyvinyl alcohol, polyethylene glycol, polysaccharides, water, and mixtures thereof. Inorganic polymer binders include silicone. Other binders may include wax or natural and synthetic oil, such as mineral oil, and mixtures thereof. Other suitable binders may be selected to leave the minimum amount of residues, such as char, after undergoing a HTHP process.

Sacrificial binder may be present in particles, such as particles having an average diameter or longest dimension of 100 µm.

The gradient interfacial layer may also include CTE adjustment materials otherwise compatible with the formation of a solid and stable layer. These CTE adjustment materials may have a CTE between that of diamond and of the substrate. Suitable CTE adjustment materials include silicone carbides, silicone nitrides, zirconium carbide, titanium carbide, and any combinations thereof.

Depending on the method used, the gradient interfacial layer, such a gradient interfacial layer 8, may be formed in steps 12 through 16 as a separate component that is later attached to both the TSP table and the substrate, or it may be formed upon the TSP table or upon the substrate and the subsequently attached to the other component. If the gradient interfacial layer is first formed as a separate component, it may be sufficiently coherent to withstand any transport or handling prior to or associated with attachment to the TSP table and substrate.

Also depending on the method used, the second or subsequent sublayers may be formed on the first or preceding sublayers, or sublayers may be formed separately or in groups of sublayers. Separate sublayers or groups of sublayers may then be assembled to form a gradient interfacial layer, such as gradient interfacial layer 8. If sublayers or combinations of sublayers are formed first as separate components, they may be sufficiently coherent to withstand any transport or handling prior to or associated with attachment to one another or to the TSP table and substrate.

Typically an additive manufacturing method, such as 3D printing, may be used in steps 12 and 14 to form a gradient interfacial layer such as gradient interfacial layer 8. Such additive manufacturing allows the sequential formation of separate sublayers. For instance, 3D printing may be used to lay down the material for each sublayer. Each sublayers may be subjected to a finishing process, such as a consolidation process, before the next sublayer is added, or groups of sublayers may be subjected to a finishing process, or even the entire gradient interfacial layer may be subjected to a finishing process. Finishing processes may include melting and compression molding. Finishing processes may be performed under conditions to avoid graphitization of the diamond grains, such as at a temperature below 900° C. in the presence of air, or at a temperature below 1050° C. in a vacuum.

In some alternative processes that otherwise use the methods disclosed herein, the first sublayer may be formed on the substrate or TSP table and the final sublayer may be formed at the time it is attached to the substrate or TSP table. Carbide formers, such as titanium (Ti), zirconium (Zr), vanadium (V), manganese (Mn) tungsten (W), molybdenum (Mo), chromium (Cr), yttrium (Y), niobium (Nb), hafnium (Hf), or tantalum (Ta) may be used as a sublayer for attachment to the TSP table without the need for a HTHP process. The carbide-forming sublayer may also be formed in using an additive manufacturing process, such as 3D printing. Alternatively, when a HTHP process is used, binder or catalyst found in the gradient interfacial layer may diffuse into the substrate and/or TSP table and bond the gradient interfacial layer thereto.

Suitable methods of forming sublayers of gradient interfacial layer, such as layer 8 according to a manufacturing method, such as steps 12 and 14 of method 10, include: binder jetting, such as when a liquid bonding agent is selectively deposited to bond powder; material jetting, such as when droplets of a building material are selectively deposited; powder bed fusion, in which thermal energy selectively fuses regions of the powder bed; direct energy deposition, in which thermal energy melts materials as they are deposited; sheet lamination, in which sheets of material are bonded together; vat polymerization, in which liquid photopolymer is selectively cured by light activation; and material extrusion, in which material is selectively dispensed through a nozzle or an orifice, including laminate object manufacturing (LOM), in which thin layers, such as papers, polymers, or metals, are cut to shape and then joined, and robocasting. Suitable methods also include direct metal laser sintering (DMLS), in which a metal particle is heated to a temperature where it fuses a material, but does not fully melt. DMLS uses three-dimensional computer aided design (3D CAD) data to create a file (such as a .stl file) that is sent to the manufacturing equipment. DMLS is compatible for use with stainless steel, such as 17-4 and 15-5 stainless; austenitic nickel-chromium-based superalloys, such as INCONEL® (Special Metals Corp., New Hartford, N.Y.) 625 or 718; or titanium and titanium alloys, such as $Ti_6AlV_4$. Suitable methods further include selective laser sintering (SLS), in which a metal particle is heated to a temperature where it fuses a material, but does not fully melt. Suitable materials for use with SLS include plastics, glass, and ceramics. Suitable methods additionally include selective laser melting (SLM), in which fine metal powders are fused with a high-powered laser. Particles are fully melted into a homogenous component. 3D CAD is used as an information source for SLM equipment. A subcategory of SLM, laser-sintering, is carried out in an inert or non-reactive atmosphere, such as argon or nitrogen. One further suitable method is fused deposition modeling (FDM), in which a plastic filament or metal wire is unwound and supplies material to produce a component. FDM is also called "wire feed 3D printing." Multiple materials may be printed on the same component, for example allowing variations within a gradient interfacial layer sublayer. After unwinding, the material is heated to melting in an extrusion nozzle, then deposited in place. Vertical and horizontal deposition are possible. A numerical control mechanism may be used. Computer-aided manufacturing (CAM) software may provide a tool path. Combinations of any of the above methods may be used to form a gradient interfacial layer, including any sublayer thereof.

Attachment step 18 may include any suitable method, such as sintering, e-beam welding, or other high temperature high pressure processes. The binder included in the gradient interfacial layer may not be degraded or expelled until this attachment step in some processes.

Any PDC disclosed herein or fabricated using the methods disclosed herein may be subjected to an additional leaching step to remove any catalyst or binder that enters the TSP table during formation of and/or attachment to the gradient interfacial layer. Such additional leaching may extend as far as possible into the TSP table without destroying bonding to the gradient interfacial layer, or it may be confined to a surface, such as a working surface or a side surface.

In a specific example, which may also include elements of the more general descriptions of PDCs and fabrication methods disclosed herein, a TSP with a gradient interfacial layer may be formed using a HTHP sintering process, such as a process conducted at temperatures as high as 1400° C. and pressures as high as 6 GPa.

The present disclosure also include modifying the rate and degree of infiltration of the catalyst during attachment of a TSP table to a substrate. HTHP processes have limited abilities to control the rate of change of process parameters. In particular, the HTHP process may cause excessive infiltration of the catalyst through the gradient interfacial layer and into the TSP table resulting in reduced gradients, thereby reducing thermal stability as well. Consequently it may be useful to decelerate the rate of catalyst infiltration to avoid excessive catalyst infiltration. At least one component or at least one discrete sublayer may modify the rate and degree of catalyst infiltration. The modification as well as its location may be adjusted along with temperature, pressure, and other HTHP process parameters to achieve the desired level of catalyst diffusion and limited infiltration.

One modification includes the introduction of a non-catalyst sintering aid such as silicon (Si), boron (B), titanium (Ti), hafnium (Hf), zirconium (Zr), niobium (Nb), vanadium (V), and combinations thereof, which form carbides during sintering process above 700° C. Such metals assist in sintering the diamond and the resultant carbide bonding matrix is extremely hard and abrasive. In addition the resultant carbide has a CTE similar to that of diamond and is chemically inert so it will not catalyze the conversion of diamond to graphite.

Any non-catalyst sintering aid having a melting point at ultra-high pressures below that of the catalyst, such as elemental silicon or alloys thereof, can infiltrate through the interstices into the gradient interfacial layer, the TSP, and the substrate and be converted to the carbide form or non-catalytic silicide or boride form.

Figure 4A:
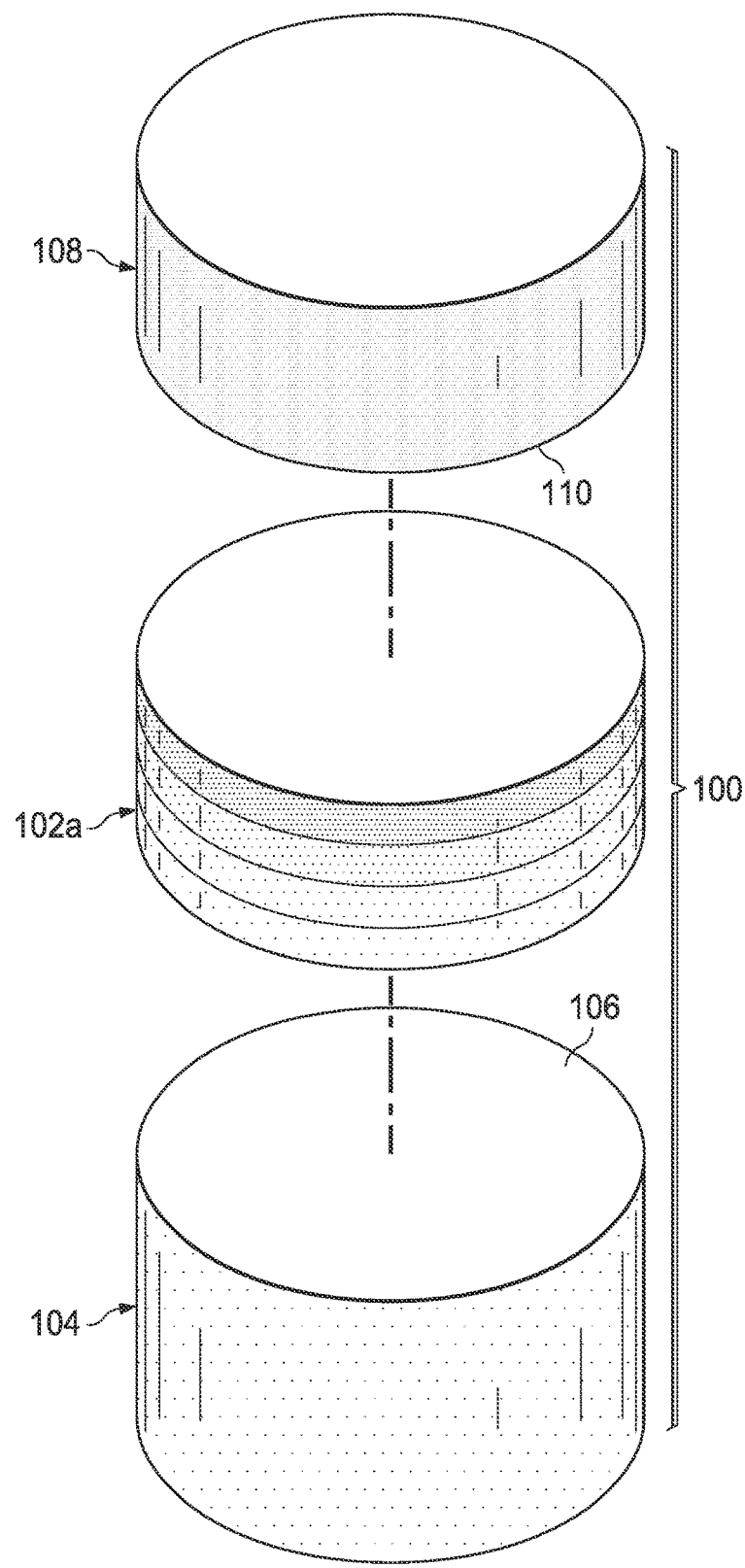
FIGS. 4A, 4B and 4C are side views during different formation steps of a PDC containing a gradient interfacial layer.
Figure 4B:
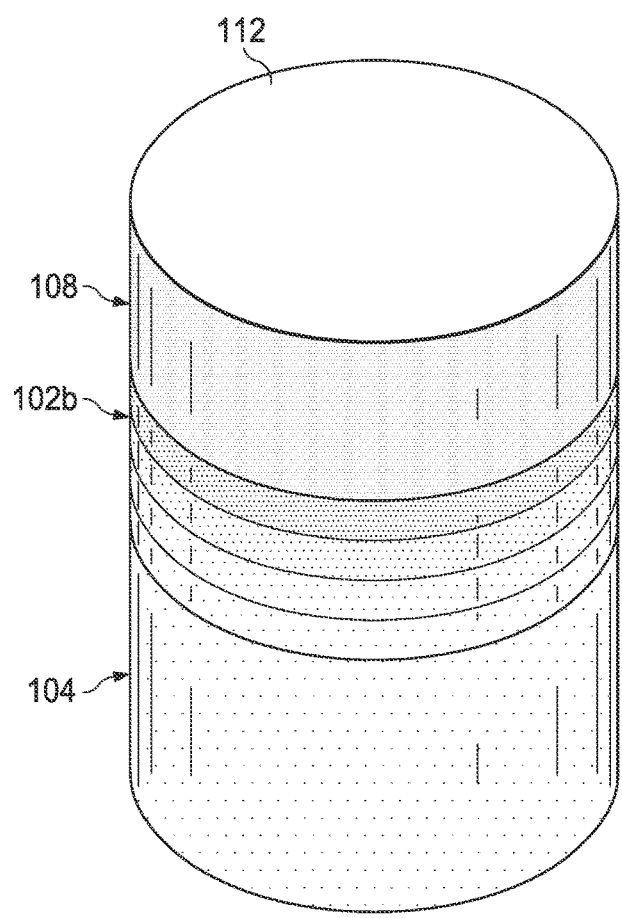
Figure 4C:
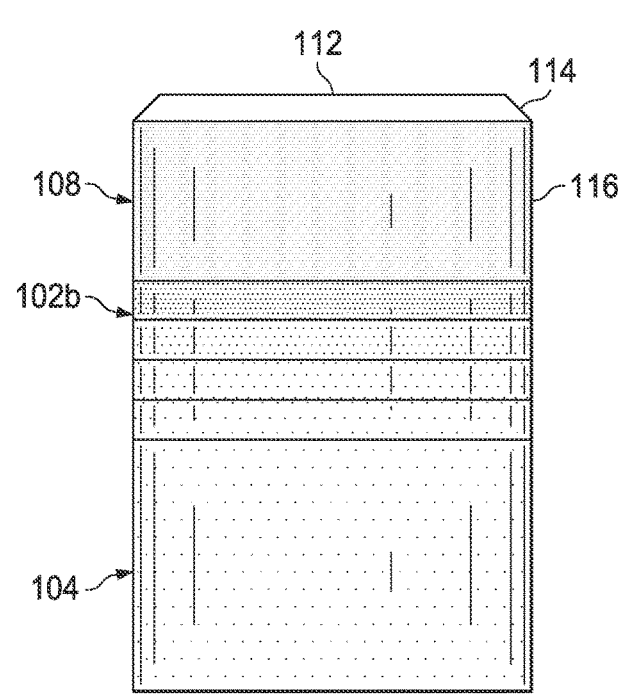

FIGS. 4A, 4B and 4C show a PDC, such as PDC 2 at different stages during its formation via a process such as that shown more generally as process 10 in FIG. 2. An assembly 100 may be formed by disposing at least two sublayers of the gradient interfacial layer 102a adjacent to the interfacial surface 106 of the substrate 104 and adjacent to the interfacial surface 110 of the TSP table 108. Gradient interfacial layer 102, substrate 104, and TSP table 108 may be joined in a process using a temperature ranging from 200° C. to 1400° C. and a pressure ranging from ambient to 9 GPa.

Assembly 100 may be placed in a pressure transmitting medium, such as a refractory metal can embedded in pyrophyllite or other pressure transmitting medium. The pressure transmitting medium, including the assembly 100 enclosed therein, may be subjected to a HTHP process using an ultra-high pressure press to create temperature and pressure conditions at which diamond is stable. The temperature of the HTHP process may be at least 1000° C., at least 1200° C., or at least 1600° C., and the pressure may be at least 4.0 GPa, 5.0 GPa to 12 GPa, or 7.5 GPa to 11 GPa. The process may occur for a length of time sufficient to sinter the diamond grains to form a sintered gradient interfacial layer 102b. For example, the pressure of the high temperature high pressure process may be 8 GPa to 10 GPa and the temperature of the may be 1150° C. to 1450° C. Upon cooling after the HTHP process, sintered interfacial gradient layer 102b is bonded to substrate 104 and TSP table 108.

The foregoing pressure values employed in the HTHP process refer to the pressure in the pressure transmitting medium that transfers the pressure from the ultra-high pressure press to the assembly 100.

During the HTHP process, catalyst present in gradient interfacial layer 102a liquefies and catalyzes formation of directly bonded-together diamond grains to form sintered gradient interfacial layer 102b. Additionally, catalyst from the substrate 104 (which may be the same as or different than the binder present in one or more sublayers of gradient interfacial layer 102) may be liquefied and may infiltrate into the diamond grains of the one or more sublayers of gradient interfacial layer 102. The infiltrated catalyst may catalyze formation of directly bonded-together diamond grains to form sintered gradient interfacial layer 102b. Sintered gradient interfacial layer 102b then includes directly bonded-together diamond grains with the infiltrated catalyst disposed interstitially between the bonded diamond grains.

Referring to FIG. 4A, sintered gradient interfacial layer 102b may be subjected to a planarization process, such as lapping, to planarize at least one surface to be suitable for attachment to TSP table 108 or substrate 104. A grinding process may be used to produce a non-planar surface for mating to TSP 108 or substrate 104, if both or either has a non-planar surface.

Referring to FIG. 4C, upper surface 112 of TSP table 108 may be subjected to a planarization process, such as lapping, to form a working surface. A grinding process may be used to form a chamfer 114 in TSP table 108 before or after the planarization process. Peripheral surface 116 may be defined in TSP table 108 using a centerless abrasive grinding process or other suitable process before or after the planarization process and/or forming the chamfer.

Figure 5A:
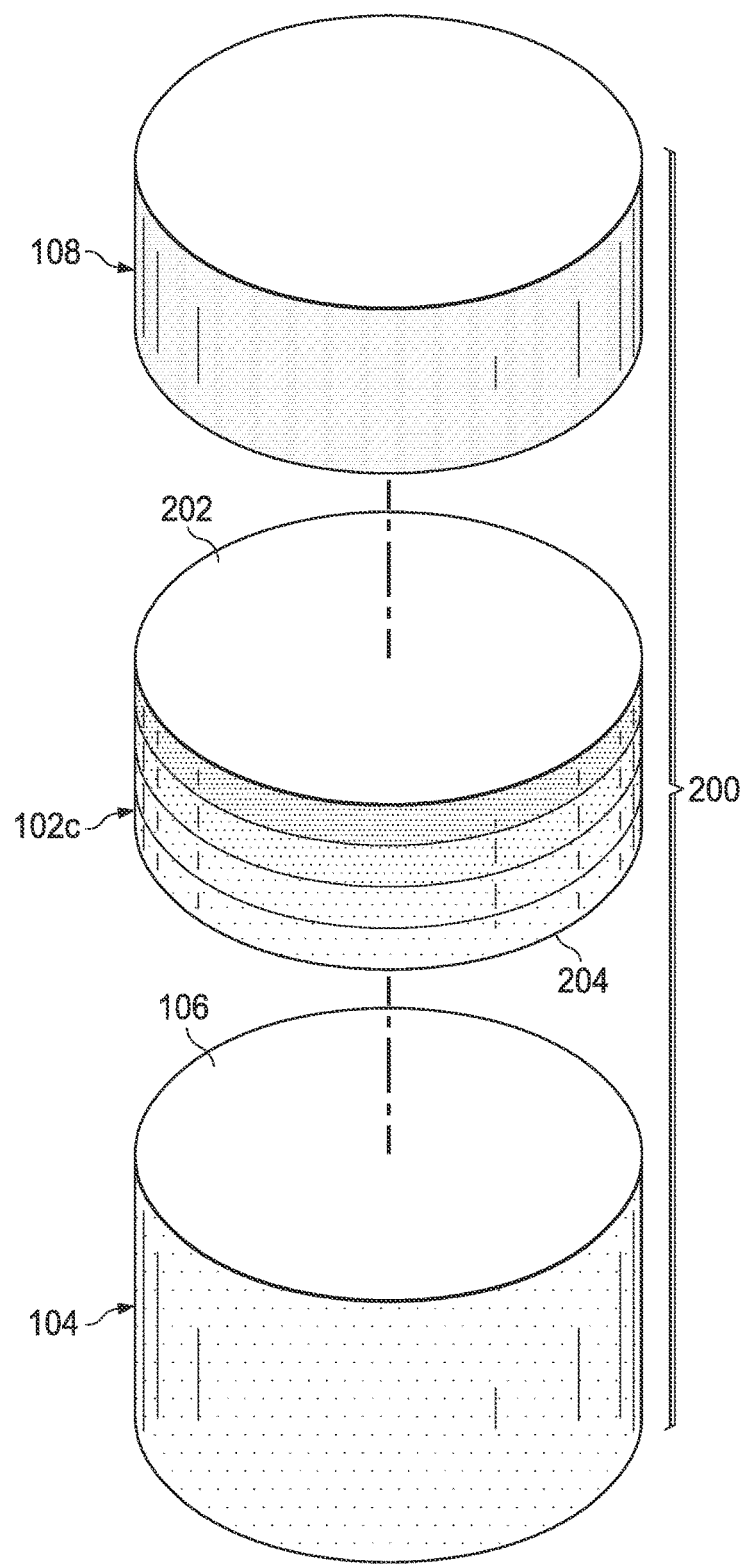
FIGS. 5A, 5B and 5C are side views during different formation steps of a PDC containing a gradient interfacial layer.
Figure 5B:
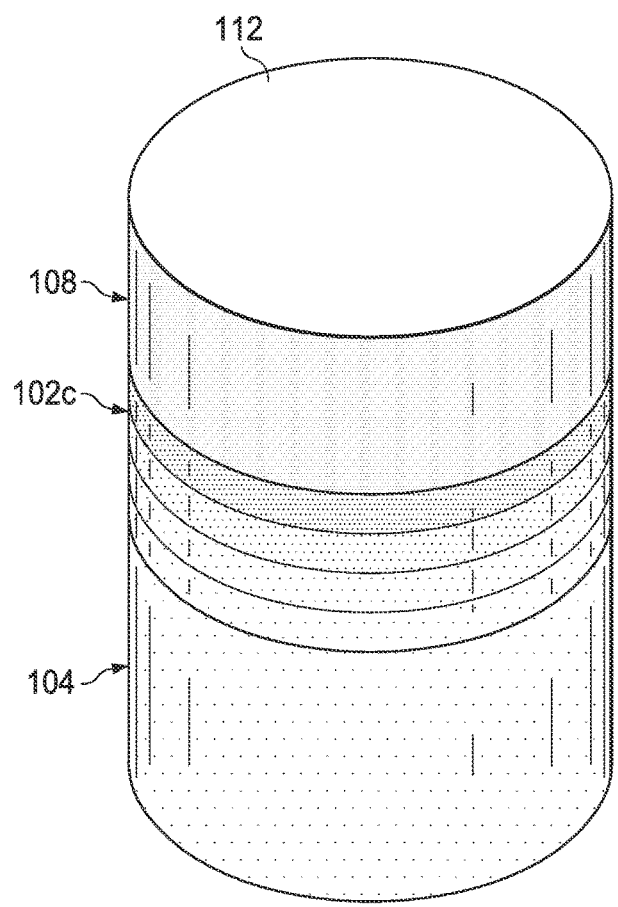
Figure 5C:
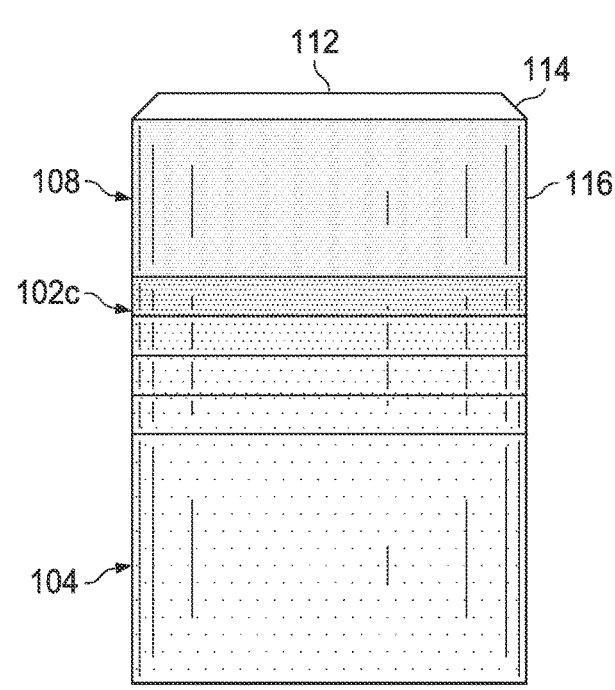

FIGS. 5A, 5B and 5C show another PDC, such as PDC 2 at different stages during its formation via a process such as that shown more generally as process 10 in FIG. 2, using a pre-sintered gradient interfacial layer 102c. Assembly 200 is formed by disposing interfacial surface 110 of TSP table 108 and interfacial surface 106 of substrate 104 adjacent to pre-sintered gradient interfacial layer 102c. Pre-sintered gradient interfacial layer 102c includes a TSP interfacial surface 202 and a substrate interfacial surface 204 positioned adjacent to the interfacial surface 106 of the substrate 104. The substrate interfacial surface 204 of the pre-sintered gradient interfacial layer 102c is configured to correspond to the geometry of the interfacial surface 106 of the substrate 104. The pre-sintered gradient interfacial layer 102c includes directly bonded-together diamond grains defining interstitial regions that form a network of at least partially interconnected pores, which enables fluid to flow between at least one of the gradient interfacial layer interfacial surfaces 202 and 204 and the interfacial surface 106 of the substrate 104.

Additive manufacturing methods, such as 3D printing, may be used to achieve the gradient structure.

The pre-sintered gradient interfacial layer 102c may be formed by HPHT sintering diamond grains with or without a substrate in the presence of a catalyst or binder with sublayers or a composition gradient as disclosed herein.

An HPHT process may also be used to fabricate the assembly. The assembly 200 may be placed in a pressure transmitting medium, such as a refractory metal can embedded in pyrophyllite or other pressure transmitting medium. The pressure transmitting medium, including the assembly 200 enclosed therein, may be subjected to an HPHT process using an ultra-high pressure press using any of the disclosed HPHT process conditions so that metal-solvent catalyst from the substrate 104 is liquefied and infiltrates into the interstitial regions of the pre-sintered gradient interfacial layer 102c. For example, the pressure of the HPHT process may be about 5 GPa to about 7 GPa and the temperature of the HPHT process may be about 1150° C. to about 1450° C., such as up to 1200° C., or up to 1400° C. Upon cooling from the HPHT process, gradient interfacial layer 102c becomes bonded to substrate 104 and TSP table 108.

Referring to FIG. 5A, the TSP interfacial surface 202 and the substrate interfacial surface 204 of pre-sintered gradient interfacial layer 102c may be subjected to a planarization process, such as lapping. Alternatively a grinding process may be used to produce a nonplanar surface for mating to TSP table 108 or substrate 104 with nonplanar surfaces to which the pre-sintered gradient interfacial layer 102c is to be attached.

Referring to FIG. 5C, upper surface 112 of TSP table 108 may be subjected to a planarization process, such as lapping, to form a working surface. A grinding process may be used to form a chamfer 114 in TSP table 108 before or after the planarization process. Peripheral surface 116 may be defined in TSP table 108 using a centerless abrasive grinding process or other suitable process before or after the planarization process and/or forming the chamfer.

Regardless of whether the gradient interfacial layer is sintered with the PDC or pre-sintered and then bonded to the substrate or TSP table in a separate HTHP process, a replacement material may be infiltrated into interstitial regions of at least a portion of gradient interfacial layer 8. For example, the replacement material may be disposed adjacent to a TSP interfacial surface, such as surface 202 and/or the peripheral surface of gradient interfacial layer 8, or adjacent to the substrate interfacial surface, such as surface 204 during another HTHP process.

A replacement material may also or alternatively be infiltrated into interstitial regions of at least a portion of TSP table 4 in a separate HTHP process. For example, the replacement material may be disposed adjacent to an upper surface, such as surface 112 and/or a peripheral surface, such as surface 116 during another HTHP process.

The replacement material may include a carbonate, including one or more carbonates of lithium (Li), sodium (Na), potassium (K), beryllium (Be), magnesium (Mg), calcium (Ca), strontium (Sr), and barium (Ba); a sulfate, including one or more sulfates of Be, Mg, Ca, Sr, and Ba; a hydroxide, including one or more hydroxides of Be, Mg, Ca, Sr, and Ba; elemental phosphorous (P) and/or a derivative thereof; a chloride, including one or more chlorides of Li, Na, and K; elemental sulfur (S); a polycyclic aromatic hydrocarbon, including one or more of naphthalene, anthracene, pentacene, perylene, coronene, or combinations of the foregoing, and/or a derivative thereof; a chlorinated hydrocarbon and/or a derivative thereof; a semiconductor material, such as germanium or a germanium alloy; and any combinations of the foregoing. For example, one suitable carbonate material is an alkali metal carbonate material including a mixture of sodium carbonate, lithium carbonate, and potassium carbonate that form a low-melting ternary eutectic system. The infiltrated alkali metal carbonate material disposed in the interstitial regions of gradient interfacial layer 102 may be partially or substantially completely converted to one or more corresponding alkali metal oxides by suitable heat treatment following infiltration.

The replacement material for TSP table 4 may include silicon (Si) or a silicon-cobalt alloy, including cobalt silicide. The replacement material may at least partially react with the diamond grains of at least a portion of TSP table 4 to form silicon carbide, cobalt carbide, a mixed carbide of cobalt and silicon, or combinations of the foregoing.

The silicon-cobalt replacement material may be present in a layer adjacent to upper surface 112. The replacement material layer may include silicon particles present in an amount of about 50 to about 60 wt % and cobalt particles in an amount of about 40 to about 50 wt %. The replacement material layer may include silicon particles and cobalt particles in an amount of about equal to or near a eutectic composition of a silicon-cobalt chemical system. The silicon particles and cobalt particles may be held together by an organic binder to form a green layer of cobalt and silicon particles. Alternatively, the layer may include a thin sheet of a silicon-cobalt alloy or a green layer of silicon-cobalt alloy particles formed by mechanical alloying having a low-melting eutectic or near eutectic composition.

Partial PDCs with gradient interfacial layers, separate gradient interfacial layers, or sublayers as described herein may be inspected for quality prior to formation of final TSP elements. Quality inspection may include visual, sonic, radiation, such as computed tomography (CT), and non-radiation inspection.

In addition, for intermediate pieces formed as separate gradient interfacial layers or sublayers that are larger than what will be used in any one final PDC, such inspections may include identification of defective regions for exclusion from final PDCs or determination of the maximum number of usable gradient interfacial layers or sublayers obtaining from the intermediate piece. An intermediate piece may be in the form of a slab, plate, rod, preform, or stock. Shaping and forming methods suitable for use with intermediate pieces include cutting, e-beam, forging, heat treatment, and shot peening.

Figure 6:
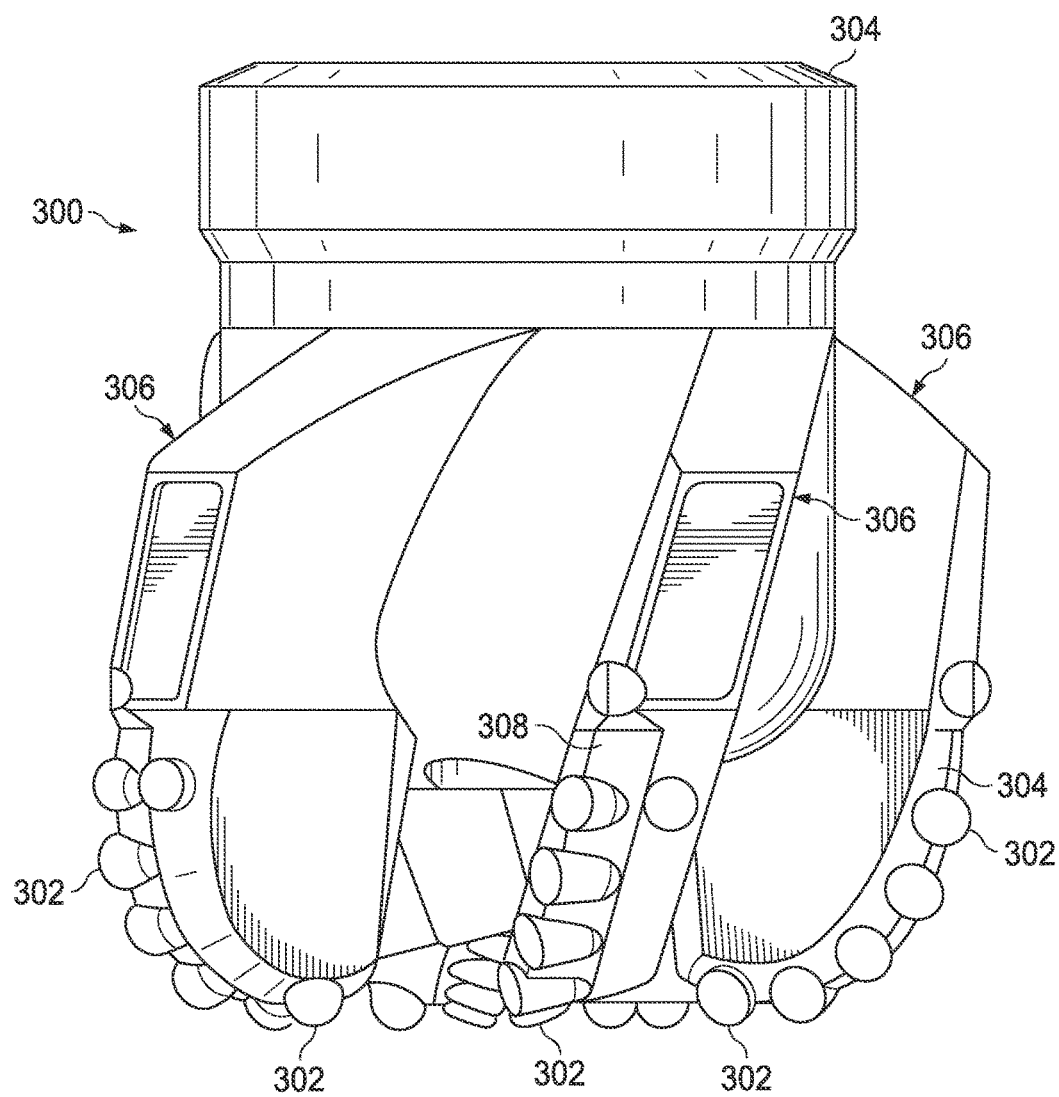
FIG. 6 is an earth-boring drill bit including at least one PDC in the form of a PDC cutter.

A PDC containing an attachment joint as described herein may be incorporated into an industrial device, such as an earth-boring drill bit, as illustrated in FIG. 6. FIG. 6 illustrates a fixed cutter drill bit 300 containing a plurality of cutters 302 coupled to drill bit body 304. At least one of cutters 302 may be a PDC containing a gradient interfacial layer as described herein, such as PDC 2 described in FIG. 1. Fixed cutter drill bit 300 may include bit body 304 with a plurality of blades 306 extending therefrom. Bit body 304 may be formed from steel, a steel alloy, a matrix material, or other suitable bit body material desired strength, toughness and machinability. Bit body 304 may be formed to have desired wear and erosion properties. PDC cutters 302 may be mounted on the bit using methods of this disclosure or using other methods. PDC cutters may be located in gage region 308, or in a non-gage region, or both.

For the embodiment shown in FIG. 6, fixed cutter drill bit 300 has five (5) blades 306. For some applications the number of blades disposed on a fixed cutter drill bit incorporating teachings of the present disclosure may vary between four (4) and eight (8) blades or more.

Drilling action associated with drill bit 300 may occur as bit body 304 is rotated relative to the bottom (not expressly shown) of a wellbore in response to rotation of an associated drill string (not expressly shown). At least some PDC cutters 302 disposed on associated blades 306 may contact adjacent portions of a downhole formation (not expressly shown) drilling. These PDC cutters 302 may be oriented such that the TSP table contacts the formation.

PDCs may also be attached to other portions of drill bit 300 (not expressly shown), such a high-wear areas, including those near nozzles, in junk slots, or in dampening or depth of cut control regions.

Furthermore, a TSP table may be attached directly to a drill bit 300 without the use of an intervening substrate. In such instances, a gradient interfacial layer as described herein may be employed. The location on the bit body at which such a TSP table may be attached may be formed from bit body material or a different material, such as a substrate material pre-set in the bit body.

The present disclosure provides an embodiment A relating to a method of forming a PDC by forming a gradient interfacial layer having a gradient of CTEs ranging between the CTE of a TSP table and the CTE of a base by forming a plurality of sublayers, at least two of which have different CTEs, and attaching the plurality of sublayers to one another, attaching the gradient interfacial layer to the TSP table, and attaching the gradient interfacial layer to the base.

The present disclosure also provides an embodiment B relating to a PDC including a TSP table having a TSP CTE, a base having a base CTE, and a gradient interfacial layer bonded to the TSP and the base, the gradient interfacial layer having a CTE gradient between the TSP CTE and the base CTE. The PDC of embodiment B may be formed using the method of embodiment A.

The present disclosure also provides an embodiment C relating to an earth-boring drill bit containing the PDC of embodiment B.

In addition, embodiments A, B and C may be used in conjunction with the following additional elements, which may also be combined with one another unless clearly mutually exclusive, and which method elements may be used to obtain devices and which device elements may result from methods: i) the gradient of CTEs may forms a CTE profile, which may be linear, non-linear, or sigmoidal; ii) the CTE profile may be non-linear and step-wise by sublayer; iii) each sublayer of the gradient interfacial layer, at least at a time of initial formation, may include diamond grains, a catalyst, and a sacrificial binder; iv) the sublayer may be subjected to a HTHP process after initial formation to form a sintered sublayer; v) the sintered sublayer may include diamond grains and catalyst; vi) the sintered sublayer may be leached to remove at least a portion of the catalyst from at least a portion of the sublayer; vii) at least one sublayer may be formed using additive manufacturing method; viii) the additive manufacturing method may include 3D printing; ix) attaching the gradient interfacial layer to the TSP table or attaching the gradient interfacial layer to the base may include performing a HTHP process; x) forming the gradient interfacial layer and attaching the gradient interfacial layer to the base may occur in the same step; xi) the base may include a substrate and the TSP element may include a cutter for an earth-boring drill bit; xii) the base may include a cemented carbide; xiii) the gradient interfacial layer may include a plurality of sublayers; xiv) the proportion of diamond grains in the gradient interfacial layer may decrease as CTE increases; xv) the CTE gradient may form a CTE profile, which may be linear, non-linear, or sigmoidal; xvi) the PDC may include a PDC cutter coupled to a bit body; xvii) the bit body may include the base.

Although only exemplary embodiments of the invention are specifically described above, it will be appreciated that modifications and variations of these examples are possible without departing from the spirit and intended scope of the invention. For instance, the use of TSP elements on other industrial devices may be determined by reference to the drill bit example.

What is claimed is:

1. A method of forming a polycrystalline diamond compact (PDC), the method comprising:
   forming a gradient interfacial layer having a gradient of coefficients of thermal expansion (CTEs) ranging between the CTE of a thermally stable diamond (TSP) table and the CTE of a base by forming a plurality of sublayers, at least two of which have different CTEs, and attaching the plurality of sublayers to one another, wherein each sublayer of the gradient interfacial layer comprises diamond grains, a catalyst able to cause bonding between the diamond grains, and sacrificial binder particles having an average diameter or longest dimension of 100 µm, the sacrificial binder able to adhere the diamond grains until the sacrificial binder is degraded and/or expelled,
   wherein, in the gradient interfacial layer adjacent to the TSP table, the sacrificial binder has a concentration of 30% or less by volume; and
   attaching the gradient interfacial layer to the TSP table;
   attaching the gradient interfacial layer to the base; and
   degrading or expelling the sacrificial binder.

2. The method of claim 1, wherein the gradient of coefficients of thermal expansion forms a CTE profile, which may be linear, non-linear, or sigmoidal.

3. The method of claim 2, wherein the CTE profile is non-linear and is step-wise by sublayer.

4. The method of claim 1, wherein the sublayer is subjected to a high temperature high pressure (HTHP) process after initial formation to form a sintered sublayer.

5. The method of claim 4, wherein the sintered sublayer comprises diamond grains and catalyst.

6. The method of claim 4, wherein the sintered sublayer is leached to remove at least a portion of the catalyst from at least a portion of the sublayer.

7. The method of claim 1, wherein at least one sublayer is formed using an additive manufacturing method.

8. The method of claim 7, wherein the additive manufacturing method comprises three dimensional (3D) printing.

9. The method of claim 1, wherein attaching the gradient interfacial layer to the TSP table or attaching the gradient interfacial layer to the base includes performing a high temperature high pressure (HTHP) process.

10. The method of claim 1, wherein forming the gradient interfacial layer and attaching the gradient interfacial layer to the base occur in the same step.

11. The method of claim 1, wherein the sacrificial binder comprises a polyolefin, a functionalized polyolefin, a wax, a thermoplastic polyurethane, a poly-aryl-ether-ether-ketone, a functionalized styrenic block copolymer, a tackifier, an aqueous and gelation polymer, an inorganic polymer, a natural oil, or a synthetic oil.

12. The method of claim 1, wherein the degrading or expelling the sacrificial binder is during the forming the gradient interfacial layer, during the attaching the gradient interfacial layer to the TSP table, or during the attaching the gradient interfacial layer to the base.

13. The method of claim 1, wherein in the gradient interfacial layer adjacent the TSP table:
   the diamond grains have a concentration of 50% or greater by volume; and
   the catalyst has a concentration of 50% or less by volume.

14. A polycrystalline diamond compact (PDC) comprising:
   a thermally stable diamond (TSP) table having a TSP coefficient of thermal expansion (CTE);
   a base having a base CTE; and
   a gradient interfacial layer bonded to the TSP and the base, the gradient interfacial layer having a CTE gradient between the TSP CTE and the base CTE, wherein the gradient interfacial layer, at least at a time of initial formation, comprises diamond grains, a catalyst able to cause bonding between the diamond grains, and sacrificial binder particles having an average diameter or longest dimension of 100 μm, the sacrificial binder able to adhere the diamond grains until the sacrificial binder is degraded and/or expelled,
   wherein, in the gradient interfacial layer adjacent to the TSP table, the sacrificial binder has a concentration of 30% or less by volume.

15. The PDC of claim 14, wherein the base comprises a substrate and the PDC comprises a cutter for an earth-boring drill bit.

16. The PDC of claim 14, wherein the base comprises a cemented carbide.

17. The PDC of claim 14, wherein the gradient interfacial layer comprises a plurality of sublayers.

18. The PDC of claim 14, wherein the proportion of diamond grains in the gradient interfacial layer decreases as CTE increases.

19. The PDC of claim 14, wherein the CTE gradient forms a CTE profile, which may be linear, non-linear, or sigmoidal.

20. An earth-boring drill bit comprising:
   a bit body; and
   a polycrystalline diamond compact (PDC) comprising:
      a thermally stable diamond (TSP) table having a TSP coefficient of thermal expansion (CTE);
      a base having a base CTE; and
      a gradient interfacial layer bonded to the TSP and the base, the gradient interfacial layer having a CTE gradient between the TSP CTE and the base CTE, wherein the gradient interfacial layer, at least at a time of initial formation, comprises diamond grains, a catalyst able to cause bonding between the diamond grains, and sacrificial binder particles having an average diameter or longest dimension of 100 μm, the sacrificial binder able to adhere the diamond grains until the sacrificial binder is degraded and/or expelled,
   wherein, in the gradient interfacial layer adjacent to the TSP table, the sacrificial binder has a concentration of 30% or less by volume.

21. The earth-boring drill bit of claim 20, wherein the PDC comprises a PDC cutter coupled to the bit body.

22. The earth-boring drill bit of claim 20, wherein the bit body comprises the base.

* * * * *